United States Patent [19]

Forrest

[11] Patent Number: 5,229,019
[45] Date of Patent: Jul. 20, 1993

[54] LOW FLUID LEAKOFF CEMENTING COMPOSITIONS AND FILTRATION CONTROL ADDITIVE FOR CEMENT

[76] Inventor: Gabriel T. Forrest, 800 Bering, Suite 301, Houston, Tex. 77057

[21] Appl. No.: 928,532

[22] Filed: Aug. 13, 1992

Related U.S. Application Data

[63] Continuation of Ser. No. 717,808, Jun. 19, 1991, abandoned, which is a continuation-in-part of Ser. No. 647,771, Jan. 30, 1991, abandoned, which is a continuation-in-part of Ser. No. 534,890, Jun. 7, 1990, abandoned, which is a continuation-in-part of Ser. No. 233,895, Aug. 15, 1988, abandoned, which is a continuation of Ser. No. 25,995, Mar. 16, 1987, abandoned, which is a continuation-in-part of Ser. No. 831,850, Feb. 24, 1986, abandoned.

[51] Int. Cl.$^5$ .................... E21B 33/13; C04B 16/02
[52] U.S. Cl. .................... 252/8.551; 166/293; 106/406; 106/724
[58] Field of Search ............... 252/8.551; 166/293; 106/406, 407, 724

[56] References Cited

U.S. PATENT DOCUMENTS

| | | | |
|---|---|---|---|
| 2,319,182 | 5/1943 | Van der Pyle | 106/406 X |
| 2,351,434 | 6/1944 | Jessen et al. | 252/8.5 |
| 2,398,347 | 4/1946 | Anderson | 166/293 X |
| 2,815,079 | 12/1957 | Goins, Jr. et al. | 166/29 |
| 2,873,250 | 2/1959 | Scott, Jr. | 252/8.5 |
| 2,943,679 | 7/1960 | Scott, Jr. et al. | 166/21 |
| 3,208,523 | 9/1965 | Coyle et al. | 166/29 |
| 3,217,801 | 11/1965 | Fast et al. | 166/42 |
| 3,245,469 | 4/1966 | Bertness | 166/39 |
| 3,364,995 | 1/1968 | Atkins et al. | 166/280 |
| 3,554,287 | 1/1971 | Eilers et al. | 166/295 |
| 3,574,099 | 4/1971 | Ryals et al. | 252/8.5 |
| 3,629,102 | 12/1971 | Lummus et al. | 252/8.512 |
| 3,675,717 | 7/1972 | Goins et al. | 166/278 |
| 3,788,405 | 1/1974 | Taylor | 175/72 X |
| 3,795,276 | 3/1974 | Eilers et al. | 166/295 |
| 3,839,263 | 10/1974 | Eilers et al. | 260/33.2 R |
| 3,931,096 | 1/1976 | Guilbault et al. | 260/42.13 |
| 3,943,996 | 3/1976 | Guilbault et al. | 166/293 |
| 3,994,852 | 11/1976 | Adams et al. | 260/29.65 |
| 4,015,991 | 4/1977 | Persinski et al. | 106/90 |
| 4,036,659 | 7/1977 | Stude | 106/90 |
| 4,082,677 | 4/1978 | Zollar et al. | 252/8.5 |
| 4,353,509 | 10/1982 | Bostian, Jr. | 241/24 |
| 4,391,925 | 7/1983 | Mintz et al. | 252/8.512 X |
| 4,397,354 | 8/1983 | Dawson et al. | 252/8.512 X |
| 4,450,009 | 5/1984 | Childs et al. | 106/76 |
| 4,502,969 | 3/1985 | Shell | 252/8.55 R |
| 4,503,170 | 3/1985 | Drake et al. | 252/8.51 X |
| 4,559,149 | 12/1985 | Shell | 252/8.51 X |
| 4,568,392 | 2/1986 | Dawson et al. | 252/8.512 X |
| 4,674,574 | 6/1987 | Savoly | 166/293 |
| 4,963,668 | 10/1990 | Allen et al. | 536/114 |
| 5,004,553 | 4/1991 | House et al. | 252/8.51 |
| 5,076,944 | 12/1991 | Cowan et al. | 507/104 |
| 5,087,611 | 2/1992 | Forrest | 507/104 |

OTHER PUBLICATIONS

"Applied Drilling Engineering", Bourgoyne et al., Society of Petroleum Engineers, 1986, pp. 85, 101, 102.
"Cementing", Smith, Society of Petroleum Engineers Inc. (Rev. Ed., Second Printing 1990) pp. 5-41, 51-54.

*Primary Examiner*—Gary Geist
*Attorney, Agent, or Firm*—Arthur F. Zobal

[57] ABSTRACT

Low fluid leakoff cementing compositions and filtration control additive for cement used in cementing operations for oil and gas wells include the use of finely ground peanut hulls.

8 Claims, No Drawings

LOW FLUID LEAKOFF CEMENTING COMPOSITIONS AND FILTRATION CONTROL ADDITIVE FOR CEMENT

1. RELATED APPLICATIONS

This is a continuation of co-pending application Ser. No. 07/717,808, filed Jun. 19, 1991, now abandoned.

Application Ser. No. 07/717,808 is a continuation-in-part of U.S. patent application Ser. No. 07/647,771 filed Jan. 31, 1991, now abandoned which is a continuation-in-part of U.S. patent, application Ser. No. 534,890, filed Jun. 7, 1990, now abandoned, which is a continuation-in-part of U.S. patent application Ser. No. 07/233,895, filed Aug. 15, 1988, now abandoned, which is a continuation of U.S. patent application Ser. No. 07/025,995, filed Mar. 16, 1987, now abandoned, which is a continuation-in-part of U.S. patent application Ser. No. 06/831,850, filed Feb. 24, 1986, now abandoned.

2. FIELD OF THE INVENTION

The invention relates to improved compositions and their use in cementing operations, particularly for cementing wells penetrating subterranean formations; and a filtration control additive for cements used in cementing wells penetrating subterranean formations.

3. DESCRIPTION OF THE PRIOR ART

In drilling and completion of wells, particularly gas and oil wells, a borehole is drilled through the overlying layers of the earth's crust to a geologic formation from which it is desired to recover a fluid mineral contained therein. A casing is then introduced into the wellbore and cemented in place. The cement secures the casing in position and prevents unwanted shifting of the casing when the fluid, being produced from the formation, moves through it under considerable pressure. The cement also serves the important function of sealing off porous formations adjacent to, or penetrated by, the wellbore. Typically, a cement slurry is pumped downwardly through tubing within the well casing and flows out of the open lower end of the casing at the well bottom. It is then forced upwardly around the casing in the annular space between the outer wall of the casing and the wall of the wellbore. Thus pumped into place, the cement slurry sets into a monolithic mass in situ. After setting, the cement prevents the flow of undesired fluids from one formation to another, especially into the formation producing the desired gas or oil.

A disadvantage of conventional neat cement slurries, which comprise hydraulic cement and water, is that they are subject to high fluid loss, or filter loss, in porous formations. The water of the cement slurry migrates into the formation and the cement solids of the slurry are filtered out onto the face of the formation. This loss of water from cement slurries is accelerated by the relatively high pressures required to inject cement slurries into the annular space between the well casing and the wellbore. This pressure often results in squeezing water from the slurry and forcing this water into the pores of the surrounding formation. This loss of water from cement slurries is also increased by the practice of mechanically scraping away the drilling mud from the wall of the wellbore prior to pumping the cement slurry into position. This procedure exposes porous formations which absorb water from the slurry.

Numerous problems are created by the loss of any appreciable amount of water from a cement slurry during a well cementing operation. For example, the lost water may contaminate the producing formation. Where oil sands are encountered, the contaminating water may cause shaley impurities in the sand to swell, thus greatly reducing the permeability of the oil sand formation. The loss of water will result in reduced fluidity of the cement slurry. This, in turn, requires increased pumping pressures and jeopardizes the entire cementing operation. Proper emplacement of the cement slurry is rendered difficult, accurate prediction of pumping times and cement volumes is prevented, cementing operation costs are increased, and final results are unsatisfactory. The loss of water from the cement slurry results in thickening or premature setting of the cement, often making completion of the cementing operation either difficult or impossible. The loss of water tends to result in a set cement of non-uniform consistency and of reduced compressive strength As is known in the cementing art, greater compressive strengths are obtained when reduced quantities of water are employed to make up the cement slurry. Thus, reduction of the loss of water from a cement slurry to surrounding formations will also result in a reduction of the initial amount of water required to make up the slurry. This will allow complete hydration of the cement with reduced amounts of water, resulting in set cements of greater compressive strength. As used herein, the term "fluid loss" refers primarily to water loss, but also may include minor amounts of other fluids which are subject to loss.

Accordingly, prior to the development of the present invention, there have been no cementing compositions or filtration control additives for cement which: are not subject to high fluid loss, or filter loss, in porous formations; do not contaminate the producing formation; do not result in reduced fluidity of the cement slurry; and provide a set cement of uniform consistency and increased compressive strength.

Therefore, the art has sought cementing compositions and filtration control additives for cement which: are not subject to high fluid loss, or filter loss, in porous formation; do not contaminate the producing formation; do not result in reduced fluidity of the cement slurry; and produce a set cement of uniform consistency and increased compressive strength.

SUMMARY OF THE INVENTION

In accordance with the invention, the foregoing advantages have been achieved through the present cementing composition, for cementing oil or gas wells penetrating subterranean formations and capable of forming a fluid slurry when mixed with water. The present invention includes dry hydraulic cement; and a filtration control additive of from about 0.2 to 5.0 percent by weight, based upon dry hydraulic cement, of finely ground peanut hulls. A feature of the invention is that sufficient water is included to produce a mixed fluid slurry having a density from about 11.0 to about 16.4 pounds per gallon. Another feature of the present invention is that the water may be present in a range of about 36 to 190 percent by weight, based upon dry hydraulic cement. A further feature of the invention is that the cementing composition may include a densifying agent, a cement setting retarder, or a polymer filtration control additive.

Another feature of the present invention is that 10 percent or more of the finely ground peanut hulls may be in the particle size range of less than 20 standard sieve mesh and greater than the 500 standard sieve mesh.

In accordance with another aspect of the invention, the foregoing advantages have also been achieved through the present process for cementing a casing in an oil or gas well penetrating a subterranean formation wherein a cement slurry, formed by mixing water and dry hydraulic cement, is pumped down the well to flow upwardly between the casing and the subterranean formation. The present invention includes the improvement of utilizing as a filtration control additive of from about 0.2 to 5.0 percent by weight, based upon dry hydraulic cement, of finely ground peanut hulls. A further feature of the invention is that 10 percent or more of the finely ground peanut hulls may be in the particle size range of less than 20 standard sieve mesh and greater than 500 standard sieve mesh. Another feature of the present invention is that a polymer filtration control additive may also be utilized.

In accordance with another aspect of the invention, the foregoing advantages have also been achieved through the present filtration control additive, for use with hydraulic cement and water. The present invention includes from about 0.2 to 5.0 percent by weight, based upon dry hydraulic cement, of finely ground peanut hulls. An additional feature of the invention is that 10 percent or more of the finely ground peanut hulls may be in the particle size range of less than 20 standard sieve mesh and greater than 500 standard sieve mesh.

The cementing composition, cementing process, and filtration control additive of the present invention, when compared to previously proposed prior art cement compositions, cementing processes, and filtration control additives, have the advantages of: not being subject to high fluid loss, or filter loss, in porous formations; not contaminating the producing formation; not resulting in reduced fluidity of the cement slurry; and producing a set cement of uniform consistency and increased compressive strength.

DETAILED DESCRIPTION OF THE INVENTION

The compositions and processes of the present invention may employ any type of hydraulic cement. Hydraulic cement is defined as any cement which will set or cure under the action of water, and is intended to include all mixtures of lime, silica and alumina, or of lime and magnesia, silica, and alumina and iron oxide. Hydraulic cements include hydraulic limes, grappier cements, pozzolan cements, natural cements, and portland cements. Pozzolan cements include slag cements made from slaked lime and granulated blast furnace slag. Among these hydraulic cements, the portland cements are preferred, chiefly because of their superior strength characteristics. The term portland cement, usually as defined by standard reference works, is intended to include any cement regarded in the cementing art as a portland cement. The precise composition of any one particular portland cement will vary from another, but generally portland cements are produced by mixing and grinding together a calcareous and an argillaceous material, kiln heating the mixture (1350° to 1800° C.) until vitrification begins, pulverizing the clinker thus produced and mixing the same with a small amount of gypsum. The portland cements may be ground to any desired particle size, and grading of portland cements is on the basis of the specific surface of the cement, which will range between 1200 and 2600 square centimeters per gram. Grading is also based on the amount of cement particles retained on a No. 325 screen, U.S. Sieve Series. Thus, preferred oil well cements have a specific surface of about 1480 square centimeters per gram and about 85 percent by weight passes through a No. 325 screen.

The hydraulic cement composition of the present invention may be prepared by mixing the cement with water and the fluid loss, or filtration control, additive, together with any number of conventional cement additives. For example, the cement may include a cement setting retarder consisting of up to about 2.0 percent by weight of dry cement. Such an additive is required to slow the thickening time to accommodate transit times ranging from a few minutes to several hours and from temperatures of ambient to in excess of 200° F. Examples of conventional retarder compositions include sodium lignosulfonate, calcium or sodium gluconate, sodium tetraborate, carboxymethylhydroxyethyl cellulose, borax, dehydrated borax, calcium lignosulfonate and ferrochrome lignosulfonate. The cement composition of the present invention may also include conventional cement setting accelerators, if necessary.

Weighting components, or densifying agents, comprising inert materials such as barite or hematite, in concentrations up to 50 percent by weight of the dry hydraulic cement, and ilmenite are often employed. These agents may be added to produce a final cement slurry density of 15.4 to 19.2 pounds per gallon. Silica may be employed to retard high temperature strength retrogression. Conventional fluid loss polymer additives may also be employed to further reduce fluid, or filter, loss to a value lower than obtainable by using either additive alone. Examples of conventional fluid loss polymer additives include: high, medium and low viscosity HEC (hydroxyethyl cellulose), polyethylene imines and amines, CMHEC, polyvinyl pyrrolidine and copolymers of specialized monomers such as DADMAC (dimethylaminoethylmethacrylate) and AMPS (2-acrylamido, 2-methyl propane sulfonic acid) with acrylamide, dimethyl acrylamide or methacrylamide.

Other known additives conventionally employed with cementing compositions may be employed with the cementing compositions of this invention, and in amounts sufficient to produce the intended modification of the cementing composition characteristics for which the additive is normally selected. More than one such additive may, of course, be employed at the same time. The fluid loss, or filtration control, additive of the present invention is utilized in an amount of sufficient quantity to produce a measurable reduction in the loss of fluid from a cement slurry to which it has been added. Preferably, the amount employed will effect a 50 percent reduction in fluid loss. While increasingly greater amounts of fluid loss reduction may be produced by employing correspondingly greater amounts of the fluid loss additive of the present invention, such reductions may not be justified economically. Moreover, amounts of fluid loss additive necessary to produce extremely high reductions of fluid loss might also produce attendant difficulties with respect to undesirable effects on the properties of the cement slurry and set cement, such as excessively retarding the setting time of the cement; however, conventional cement setting accelerators may be utilized to overcome such a problem.

The cementing composition of the present invention is comprised of, but not limited to, water, hydraulic cement and the filtration loss additive of the present invention.

The filtration control, or fluid loss additive, of the present invention for cements used for cementing wells in subterranean formations penetrated by a well bore is preferably the soft portion of a legume —peanut hulls. Raw, unground peanut hulls are finely ground and are added to the conventional cement, as will hereinafter be described in greater detail. Preferably, the raw peanut hulls are fully ground into a powder, or powder-like consistency. The raw peanut hulls are ground, in any conventional manner, to a preferred particle size range of less than 20 standard sieve mesh, U.S. Standard Sieve Series, and greater than 500 standard sieve mesh, U.S. Standard Sieve Series. When raw peanut hulls are ground into the foregoing particle size range, a layer of natural lignin is exposed. Laboratory tests have determined that the typical composition of peanut hulls is 35% to 45% cellulose and 27% to 33% lignin. Chemical analysis of peanut hulls indicate that they have the following composition: 8% to 10% moisture; 6% to 7% crude protein; 1% fat; 35% to 45% cellulose; 27% to 33% lignin; and 3% to 4% ash. In the preferred particle size range, a natural layer of lignin is exposed which lowers the water solubility of the filtration control additive such that it slowly swells.

Preferably, the filtration control additive of the present invention is comprised of finely ground peanut hulls in the foregoing described particle size range, and at least 10% or more of the finely ground peanut hulls fall within the foregoing particle size range. It is believed that use of some finely ground peanut hulls of a size less than 500 standard sieve mesh will not detract from the effectiveness of the filtration control additive of the present invention; however, cost considerations in grinding peanut hulls to that size, at the present time, suggest the preferred lower end of the particle size range, for the majority of the ground peanut hulls, being greater than 500 standard sieve mesh. At the present time, it is believed that use of finely ground peanut hulls, wherein more than 10% of the particle size range is larger than 20 standard sieve mesh, would reduce the effectiveness of the filtration control additive, since the lignin layer of the peanut hulls would likely not be sufficiently exposed.

The filtration control additive of the present invention should be added to the hydraulic cement in an amount within the range of from 0.2 to 5.0 percent by weight of the dry hydraulic cement, and combined with sufficient water to produce a cement slurry having a density of approximately 11.0 to 16.4 pounds per gallon, the water being present in a range of approximately 36 to 190 percent by weight of the dry hydraulic cement. Preferably, the filtration control additive, or finely ground peanut hulls of the present invention, are added to the hydraulic cement in an amount within the range of 0.2 to 1.0 percent by weight of dry hydraulic cement. The filtration control additive may be added to the hydraulic cement and water in any conventional manner, as by: mixing the filtration control additive with the hydraulic cement and water in any suitable mixer device.

In order to facilitate a better understanding of the present invention, the following examples are given:

EXAMPLE 1

Evaluation of Fluid Loss Properties

Tests were conducted in the laboratory of the type described in the American Petroleum Institute publication entitled "API Specification for Material and Testing for Well Cements" (API SPEC 10, 1st Ed., January 1982). A cement slurry was made up containing 700 gm API Class "H" Cement and 7.0 gm fluid loss, or filtration control, additive of the present invention (1.0 percent by weight of dry hydraulic cement) in 322.4 ml deionized water for a total volume of 600 ml. These ingredients were mixed in a Waring Blender for 15 seconds at low speed, and then 35 seconds at high speed. The resultant slurry was then placed in a NOWSCO PC-10 high pressure, high temperature consistometer and stirred for 20 minutes at 180° F. The pre-conditioned slurry was then rapidly transferred to a Baroid high pressure filter press preheated to 180° F. The filter medium, which is a No. 325 U.S. Standard Sieve Series screen supported by a No. 60 mesh screen fabricated from stainless steel as an integral unit, is placed in the top of the cell on an O-ring seal. The cell is capped and is inverted and connected to a nitrogen gas cylinder. The lower valve is opened and 1000 psi is applied to the cell. The volume of filtrate produced is recorded at 0.25, 0.5, 1, 2 and 5 minutes and thereafter at 5 minutes intervals, until 30 minutes have elapsed. The quantity of filtrate produced is multiplied by 2 to determine the API fluid loss volume. For slurries that dehydrate in less than 30 minutes, the hypothetical 30 minute fluid loss value is calculated by equation 1.

$$Q_{30} = Q_t \times \frac{5.477}{\sqrt{t}} \quad (1)$$

$Q_{30}$ = hypothetical quantity of filtrate in 30 minutes
$Q_t$ = quantity of filtrate at time t.
t = time in minutes when the test ended
The results obtained are illustrated in Table 1.

TABLE 1

| Sample | Concentration of Additive (percent of weight of dry cement) | Fluid Loss (ml/30 min. at 1000 psi) |
|---|---|---|
| Neat Cement | 0.0 | 2139.0 |
| Ground Peanut Hulls | 1.0 | 807.0 |

This data illustrates that the filtration control additive, or ground peanut hulls, reduce the fluid loss of neat cement by a factor of 62%.

EXAMPLE 2

Using the fluid loss evaluation procedure described in Example 1, the beneficial effects of adding the fluid loss, or filtration control, additive of the present invention to hydraulic cement containing a conventional polymer fluid loss additive, hydroxyethyl cellulose (HEC), was examined. The results of these tests are provided in Table 2.

TABLE 2

| Test Number | Concentration of Additive (percent of weight of dry cement) | | Fluid Loss (ml/30 min at 1000 psi) |
|---|---|---|---|
| | HEC[1] | Ground Peanut Hulls | |
| 1 | 0 | 0 | 2139 |
| 2 | 0.2 | 0 | 275 |

TABLE 2-continued

| Test Number | Concentration of Additive (percent of weight of dry cement) | | Fluid Loss (ml/30 min at 1000 psi) |
| --- | --- | --- | --- |
| | HEC[1] | Ground Peanut Hulls | |
| 3 | 0.2 | 0.5 | 167 |
| 4 | 0.2 | 1.0 | 132 |
| 5 | 0.3 | 0 | 118 |
| 6 | 0.3 | 0.6 | 83 |
| 7[2] | 0.3 | 0.6 | 77 |

[1] The HEC was a high viscosity grade marketed by Union Carbide as HEC-10.
[2] also contains 3.0% mineral seal oil to aid in reducing the permeability of the filter cake formed.

This data illustrates that the filtration control additive, or ground peanut hulls, are effective in the presence of traditional polymer fluid loss additives in further reducing the fluid loss from cement slurries.

Example 3

U.S. Pat. No. 4,963,668 discloses the use of a new biopolymer, welan gum, as an improved fluid loss polymer. Tests were conducted using the fluid loss procedure and conditions described in Example 1. The results of these tests are provided in Table 3.

TABLE 3

| Test Number | Concentration of Additive (percent of weight of dry cement) | | Fluid Loss (ml/30 min at 1000 psi) |
| --- | --- | --- | --- |
| | welan Gum | Ground Peanut Hulls | |
| 1 | 0.2 | 0 | 267 |
| 2 | 0.2 | 0.6 | 188 |

This data illustrates that the filtration control additive, or ground peanut hulls, of the present invention are effective in further decreasing fluid, or filter, loss from cement slurries in the presence of recently patented polymer fluid loss additives.

It is to be understood that the invention is not limited to the exact details of construction, operation, exact materials, or embodiments shown and described, as obvious modifications and equivalents will be apparent to one skilled in the art. Accordingly, the invention is therefore to be limited only by the scope of the appended claims.

I claim:

1. A cementing composition, for cementing oil or gas wells penetrating subterranean formations, capable of forming a fluid slurry when mixed with water comprising:
   dry hydraulic cement; and
   a filtration control additive of from about 0.2 to 5.0 percent by weight, based upon dry hydraulic cement, of finely ground peanut hulls,
   wherein 10 percent or more of the finely ground peanut hulls is in the particle size range of less than 20 standard sieve mesh and greater than 500 standard sieve mesh.

2. The cementing composition of claim 1, including sufficient water to produce a mixed fluid slurry having a density from about 11.0 to about 16.4 pounds per gallon.

3. The cementing composition of claim 2, wherein the water is present in a range of about 36 to 190 percent by weight, based upon dry hydraulic cement.

4. The cementing composition of claim 1, including a densifying agent.

5. The cementing composition of claim 1, including a cement setting retarder.

6. The cementing composition of claim 1, including a polymer filtration control additive.

7. In a process for cementing a casing in an oil or gas well penetrating a subterranean formation wherein a cement slurry, formed by mixing water and hydraulic cement, is pumped down the well to flow upwardly between the casing and the subterranean formation, the improvement comprising:
   utilizing as a filtration control additive of from about 0.2 to 5.0 percent by weight, based upon dry hydraulic cement, of finely ground peanut hulls, and
   utilizing finely ground peanut hulls wherein 10 percent or more of the finely ground peanut hulls is in the particle size range of less than 20 standard sieve mesh and greater than 500 standard sieve mesh.

8. The process of claim 7, including the step of utilizing a polymer filtration control additive.

* * * * *